United States Patent
Grill et al.

(10) Patent No.: US 10,352,197 B2
(45) Date of Patent: Jul. 16, 2019

(54) DEVICE AND METHOD FOR RECOGNIZING LEAKS IN CLOSED CIRCULAR PROCESSES

(71) Applicant: ORCAN ENERGY AG, München (DE)

(72) Inventors: Andreas Grill, München (DE); Jens-Patrick Springer, München (DE); Richard Aumann, München (DE); Roy Langer, München (DE); Daniela Walter, Rosenheim (DE); Andreas Schuster, Tussenhausen (DE)

(73) Assignee: ORCAN ENERGY AG, München (DE)

( * ) Notice: Subject to any disclaimer, the term of this patent is extended or adjusted under 35 U.S.C. 154(b) by 170 days.

(21) Appl. No.: 15/303,902

(22) PCT Filed: Apr. 9, 2015

(86) PCT No.: PCT/EP2015/057722
§ 371 (c)(1),
(2) Date: Oct. 13, 2016

(87) PCT Pub. No.: WO2015/158600
PCT Pub. Date: Oct. 22, 2015

(65) Prior Publication Data
US 2017/0030227 A1     Feb. 2, 2017

(30) Foreign Application Priority Data

Apr. 16, 2014 (EP) .................................... 14164959

(51) Int. Cl.
*G01M 3/00*     (2006.01)
*F01K 13/00*     (2006.01)

(52) U.S. Cl.
CPC ........... *F01K 13/003* (2013.01); *G01M 3/002* (2013.01)

(58) Field of Classification Search
CPC ...... F01K 13/003; F01K 13/006; F01K 13/02; F01K 3/22; F25B 49/005; F25B 2500/222;
(Continued)

(56) References Cited

U.S. PATENT DOCUMENTS

2005/0204756 A1* 9/2005 Dobmeier ............. F25B 49/005
                                                                        62/149
2006/0086103 A1* 4/2006 Lee ......................... F24F 11/30
                                                                        62/126

(Continued)

FOREIGN PATENT DOCUMENTS

DE     102011117054 A1     5/2012
DE     102010054736 A1     6/2012
(Continued)

OTHER PUBLICATIONS

European Search Report for European Patent Application No. EP14164959.0 dated Oct. 29, 2014.
(Continued)

*Primary Examiner* — Mark A Laurenzi
*Assistant Examiner* — Mickey H France
(74) *Attorney, Agent, or Firm* — Moore & Van Allen PLLC; Henry B. Ward, III (57) ABSTRACT

The invention relates to a method for detecting a leak in a thermodynamic cycle device with a condenser for condensing vaporous working medium, comprising the following steps: determining sub-cooling of the working medium in the condenser, wherein sub-cooling is determined as a difference between a condensation temperature in the condenser and a temperature of a liquid working medium exiting the condenser; detecting a leak in the event that the sub-cooling determined differs from a setpoint value for the sub-cooling or in the event that a filling quantity of the working medium in the thermodynamic cycle device, being determined from the determined sub-cooling, differs from a setpoint value for the filling quantity. The invention further relates to a corresponding computer program product and to a corresponding device.

18 Claims, 5 Drawing Sheets

(58) Field of Classification Search
CPC ... F25B 2500/19; F25B 13/00; F25B 2600/21
USPC ..... 62/149, 129, 468, 126, 127; 60/645, 646
See application file for complete search history.

(56) References Cited

U.S. PATENT DOCUMENTS

| | | | | |
|---|---|---|---|---|
| 2007/0156373 A1* | 7/2007 | Yamashita | ............ | F25B 49/005 |
| | | | | 702/182 |
| 2009/0071175 A1* | 3/2009 | Pham | ................... | F25B 49/005 |
| | | | | 62/129 |
| 2013/0199173 A1* | 8/2013 | Voss | ....................... | F01K 25/10 |
| | | | | 60/530 |

FOREIGN PATENT DOCUMENTS

| | | |
|---|---|---|
| EP | 2133544 A1 | 12/2009 |
| WO | 2013057991 A1 | 4/2013 |

OTHER PUBLICATIONS

International Search Report for International Patent Application No. PCT/EP2015/057722 dated Jun. 25, 2015 (English translation attached herewith).

\* cited by examiner

DEVICE AND METHOD FOR RECOGNIZING LEAKS IN CLOSED CIRCULAR PROCESSES

FIELD OF THE INVENTION

The invention relates to a method for detecting a leak in a thermodynamic cycle device and such a thermodynamic cycle device, in particular an ORC device.

PRIOR ART

In thermodynamic cycles, such as refrigeration processes or power plant processes (such as ORC), feed tanks are commonly used to stock the fluid. The fluid level in this feed tank can be used to draw conclusions about the filling quantity in the system. If the cycle does not use a feed tank, which is advantageous for various reasons, then the filling level in the system can with conventional level sensors no longer be determined with the desired precision or only with much more expensive solutions. However, this is necessary in order to detect leaks and to either replenish working medium during a scheduled service, or to initiate countermeasures (servicing) advantageously already upon occurrence of the leak. In addition, certain regulations (for example, Regulation (EC) no. 842/2006 regarding fluorinated greenhouse gases) require systems for leak detection.

An exemplary system for generating electrical energy from thermal energy using the Organic Rankine Cycle as a thermodynamic cycle (ORC system) without the feed tank is composed of the following main components: a feed pump that delivers fluid organic working medium subject to pressure increase to an evaporator, the evaporator itself in which the working medium is evaporated subject to the supply of heat and optionally additionally superheated, an expansion engine in which the high pressure gas is expanded, thereby producing mechanical energy which is via a generator converted into electrical energy, and a condenser in which the low-pressure gas from the expansion engine is liquefied. The fluid working medium passes from the condenser back to the feed pump of the system, whereby the thermodynamic cycle is closed.

To avoid cavitation in the pump, the fluid working medium is sub-cooled, i.e. is cooled to a temperature which is below the condensation temperature (equivalent to the boiling temperature) at the condensation pressure. The NPSH value (Net Positive Suction Head) necessary for the pump is in this manner obtained.

If no level sensor is present in the system, a leak is in prior art at a standstill detected by way of conventional search methods (for example, refrigerant detector or leak detection spray). This method is cumbersome and detection of a leak may not be possible therewith depending on the type of working medium used. Other reasons for the lack of practicability of conventional leak detection methods can be due to the type of working medium in conjunction with ambient and ancillary conditions. For example, there may be a vacuum in the system due to the working medium being at a standstill, dilution of the substance to be detected in highly ventilated pipes or insulated piping can make detection more difficult. Moreover, it is disadvantageous that leak detection is not possible therewith during operation.

DESCRIPTION OF THE INVENTION

The object of the invention is to obtain an indication about the amount of substance of working medium currently in the closed loop cycle without any conventional level sensor such as floaters, capacitive sensors or the like.

This object is satisfied by a method according to claim 1.

The method according to the invention for detecting a leak in a thermodynamic cycle device with a condenser for condensing vaporous working medium comprises the following steps: determining sub-cooling of the working medium in the condenser, wherein sub-cooling is determined as a difference between a condensation temperature in the condenser and a temperature of a fluid working medium exiting the condenser; detecting a leak in the event that the sub-cooling determined differs from a setpoint value for the sub-cooling or in the event that a filling quantity of the working medium in the thermodynamic cycle device, being determined from the determined sub-cooling, differs from a setpoint value for the filling quantity.

The method according to the invention is based on the fluid working medium in the condenser (after condensation from the vaporous state at a condensation pressure and an associated condensation temperature) further cooling in the condenser due to contact with the cooling surfaces before the working medium exits the condenser back towards the feed pump. If a leak is present, then the fluid level of the working medium in the condenser changes, the fluid level in particular drops with a decrease of the filling quantity of the working medium, so that the contact surface between the condenser and the fluid changes, leading to a change in the sub-cooling. With a decrease of the filling quantity, sub-cooling is reduced, i.e. the difference to the condensation temperature will no longer be as great. A leak can then be concluded from the changed sub-cooling. It is also advantageous in particular that this method can be employed during operation of the thermodynamic cycle. The step of detecting designates the detection of a leak or the conclusion that a leak is present.

The method according to the invention can be further developed to the effect that the filling quantity of the working medium, in particular a mass or volume of the working medium, can be determined from the determined sub-cooling by use of a relationship between sub-cooling and the filling quantity, where the relationship between sub-cooling and the filling quantity can in particular be a functional relationship or a tabular association between sub-cooling and the filling quantity.

Another development is that the condensation temperature can be determined from a condensation pressure measured. This has the advantage that the condensation temperature must not be measured directly, but can be calculated indirectly from the condensation pressure that can be measured in a simple manner. The calculation is performed by use of media-dependent relationships of pressure and temperature (equations of state), for example, from material data, in particular the pressure-dependent saturation temperature of the respective working medium.

According to another development, the condenser can comprise condenser surfaces that are arranged vertically or condenser surfaces that are inclined at an angle between 0° and 80°, preferably between 0° and 45°, highly preferably between 0° and 30°, relative to the vertical direction, the condenser can in particular be a vertical tube condenser, a microchannel condenser, a mini or microtube condenser, or a vertical plate condenser. The method according to the invention is applicable particularly advantageously for these types of condensers because the contact surface between the fluid working medium and the condenser changes greatly already with a small leak and thereby leads to a significant change of the sub-cooling.

Another development is that the sub-cooling can be determined at a first and a second point in time and the step of detecting can comprise: detecting the leak in the event that sub-cooling has at a second point in time decreased by a predetermined magnitude with respect to the sub-cooling at the first point in time or in the event that the filling quantity has reduced by a predetermined amount. By setting a predetermined value, process-related fluctuations occurring during normal operation can be excluded as a reason for leak detection.

This development can be further developed to the effect that no alert signal is outputted for sub-cooling or the filling quantity in the event of a drop below an alert threshold lasting less than an alert time period and a alert signal is outputted in the event of a drop below the alert threshold lasting for the alert time period or longer. In this, the sub-cooling remaining below the alert threshold for a short period of time is taken into account in order to distinguish from a continuous change of sub-cooling or the filling quantity.

According to another embodiment, sub-cooling and the filling quantity can be determined at further points in time, in particular continuously, and a time of failure can be predicted from the values determined at which a threshold sub-cooling or a threshold filling quantity is reached at which the thermodynamic cycle device is no longer operational. The trend of a decrease in sub-cooling is in this manner extrapolated and it is determined when a critical threshold value for sub-cooling or the filling quantity is expected to be reached.

This development can be further developed to the effect that an additional service for repairing the leak is performed prior to the time of failure in the event that the predicted time of failure is prior to a time of a standard service of the thermodynamic cycle device, and/or a service for repairing the leak is performed together with the standard service in the event that the predicted time of failure is at or after the time of standard service of the thermodynamic cycle device. In this manner, failure of the thermodynamic cycle device is avoided and the number of services can be reduced.

Another development is that the setpoint value for sub-cooling can be predetermined for different states of the thermodynamic cycle device.

The invention also provides a computer program product comprising program elements that are suitable for performing the method according to the invention or one of the developments when loaded into a computer.

The object according to the invention is further satisfied by a device according to claim 12.

The thermodynamic cycle device according to the invention, in particular an ORC device, comprises:

a condenser for condensing vaporous working medium; a temperature sensor for measuring a temperature of a fluid working medium exiting from the condenser, and a device for determining sub-cooling of the working medium in the condenser, wherein the sub-cooling is determined as a difference between a condensation temperature in the condenser and a temperature of the fluid working medium exiting the condenser; and for detecting a leak in the event that the determined sub-cooling differs from a setpoint value for the sub-cooling or in the event that a filling quantity of the working medium in the thermodynamic cycle device, being determined from the determined sub-cooling, differs from a setpoint value for the filling quantity. The advantages of the device according to the invention and its developments correspond to those of the method according to the invention and its developments and are presently not specified again.

According to a further development of the thermodynamic cycle device according to the invention, the device for determining and detecting can comprise: a pressure sensor for measuring a condensation pressure which is arranged in particular in the condenser; and an evaluation device for (i) determining a condensation temperature in the condenser from the condensation pressure measured, (ii) determining the sub-cooling of the working medium in the condenser as the difference between a condensation temperature in the condenser and a temperature of the fluid working medium exiting the condenser, and (iii) detecting the leak in the event that the sub-cooling determined differs from the setpoint value for the sub-cooling or in the event that the filling quantity determined from the determined sub-cooling differs from the setpoint value for the filling quantity. The pressure sensor can be arranged in the condenser or at a different location on the low pressure side of the cycle device. The temperature sensor is provided, for example, in the condenser at the outlet of the condenser, but it can also be located elsewhere between the condenser and the feed pump, e.g. in the line to the feed pump, preferably close to the outlet of the condenser.

Another development is that the evaluation device for determining the filling quantity of the working medium in the thermodynamic cycle device, in particular a mass or a volume of the working medium, can be formed from the sub-cooling thus determined using a relationship between the sub-cooling and the filling quantity.

According to another development, the condenser can comprises vertically arranged condenser surfaces, in particular, where the condenser is a vertical tube condenser, a microchannel condenser, a mini or microtube condenser, or a vertical plate condenser.

The developments mentioned can be used individually or as claimed suitably in combination with each other.

Further features and exemplary embodiments as well as advantages of the present invention are illustrated below using the figures. It is understood that the embodiments do not exhaust the scope of the present invention. It is further understood that some or all features described hereafter can also be combined with each other in different ways.

EMBODIMENTS

According to the invention, a change in the quantity of working medium currently in the closed circuit can be concluded without a conventional level sensor. This is enabled by having knowledge of the media sates during operation and the fluid distribution in the system calculated therefrom. The key aspect of the invention is to determine the sub-cooling of the medium, which further leads to a conclusion about the filling level in the vertically arranged condenser and about the quantity of working medium present in the cycle by using further material properties and system parameters.

The advantages of the invention are that no level sensor is necessary, that values can be determined in the future by trend monitoring and slow leaks can be measured, that a deviation in the filling quantity can by trend monitoring be determined relatively accurately without the filling quantity needing to be known exactly as an absolute value, that the determined sub-cooling can be used as an alert or switch-off criterion for the ORC system, that certain working media can be used whose gas pressure is at ambient temperature below the ambient pressure and yet a leak can be detected, and that requirements regarding a leak detection system according to (EC) No. 842/2006 can be complied with. A further advantage is that a leak can be detected in the operational state.

A drawback is that prediction of sub-cooling is possible for only one type of system because the filling quantity calculation depends on the geometry of the components used, that very precise measuring technology must be used for a prediction of absolute values of the filling level or the leak, respectively.

Relationship between Filling Quantity $m_{Fluid}$ and Sub-Cooling $\Delta T_{UK}$ of the Fluid For safe operation of a cycle process for generating electricity using organic media, a certain distance of the working media pressure from the evaporation pressure of the prevailing fluid temperature in the inlet of the feed pump is possible, this distance is also referred to as the net positive suction head (NPSH). This can be ensured by three measures, individually or in combination:

1. a height difference between the feed pump and the fluid level, in the case of application presently mentioned, the fluid level is in the condenser, 2. pressurizing the working medium with a primary pressure by inert gas (see, for example, DE10 2009 053 390 B3), 3. sub-cooling the working medium; the temperature $T_{Kond}$ of the fluid is lower on the feed side than the evaporation temperature $T'_{Kond}$ associated with the condensation pressure, where sub-cooling is defined as $\Delta T_{UK} = T'_{Kond} - T_{Kond}$.

In particular the application of the last option allows a particularly compact design of the ORC system, since no or only a small difference in height is required, and also the feed tank can be omitted. In prior art, however, horizontally arranged condenser surfaces or tubes are commonly used. This has the drawback that much more fluid must by way of design be stored in the condenser train used for sub-cooling or that a separate sub-cooler must be used.

Condenser surfaces being vertical or inclined are advantageous. Sufficient sub-cooling can be ensured when sufficient working medium is introduced into the system such that the vertically disposed condenser surfaces are during operation partly filled with fluid working media. The filled portion of the condenser then acts as a sub-cooler. With known components (known internal volumes) and a specific configuration state, that filling quantity for the system can be calculated which ensures adequate sub-cooling for all operating states.

Figure 1:
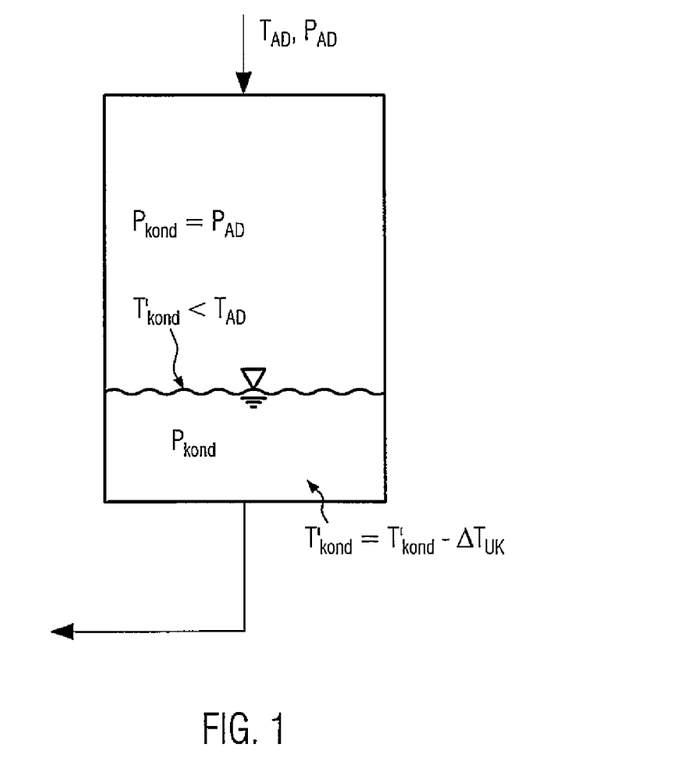
FIG. 1 schematically shows the sub-cooling over partially filled surfaces of a vertically disposed condenser.

FIG. 1 schematically shows sub-cooling over partially filled surfaces of a vertically disposed condenser. Exhaust gas enters a condenser from an expansion engine at a temperature $T_{AD}$, where a pressure $p_{Kond}$ corresponding to the exhaust gas $P_{AD}$ prevails in the condenser (or the entire low-pressure region between the expansion machine and feed pump).

Leak Detection by Way of Sub-Cooling $\Delta T_{UK}$

As described above, sub-cooling is determined by way of the quantity of working medium in the system. If the quantity reduces due to leakage, also sub-cooling reduces with otherwise comparable operating parameters of the ORC system. The fluid level in the condenser surfaces disposed vertically or inclined drops due to leakage. A smaller surface area for heat transfer is therefore available, the fluid can be cooled down less below the condensation temperature $T'_{Kond}$, sub-cooling $\Delta T_{UK}$ is less.

With the horizontal condensers or separate sub-coolers used in prior art, the quantity of fluid working medium stored is very large in order to realize sub-cooling. A small leak would in this case not significantly or only slightly change the fluid level. Sub-cooling therefore also does not change significantly and such a system can not be reliably used for the detection of small leaks. If instead vertical condenser heat exchangers are used, the cross-sectional area filled with fluid is significantly smaller. In particular suitable for this purpose are microchannel heat exchangers, such as those also used in the automotive industry as radiators. Due to the very small cross-sectional area of the micro-channel, already a small leak greatly changes the height of the fluid level and thereby the sub-cooling. A condenser design similar to the microchannel in terms of its function is mini- or microtube heat exchangers with cross-sectional areas significantly smaller as compared to conventional tube condensers. Also possible is the use of plate heat exchangers, which with a vertical plate orientation exhibit a similar behavior, on the cold side predominantly use fluid as the cooling medium.

Figure 2A:
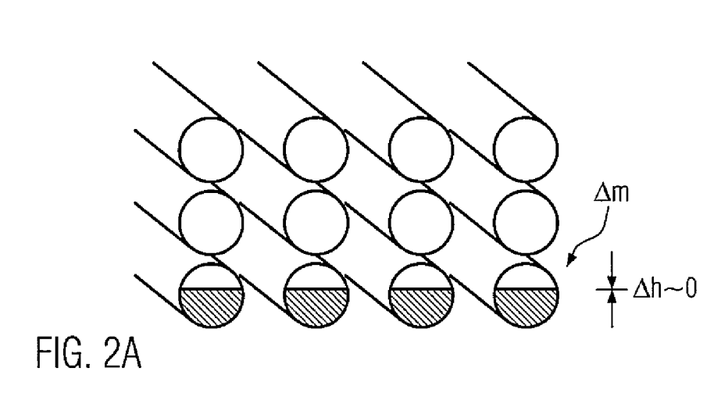
FIGS. 2A, B, C show different types of condensers.

FIG. 2A shows a horizontal tube condenser. The difference in height of the fluid level with a leak and the loss of mass $\Delta m$ associated therewith tends toward 0.

Figure 2B:
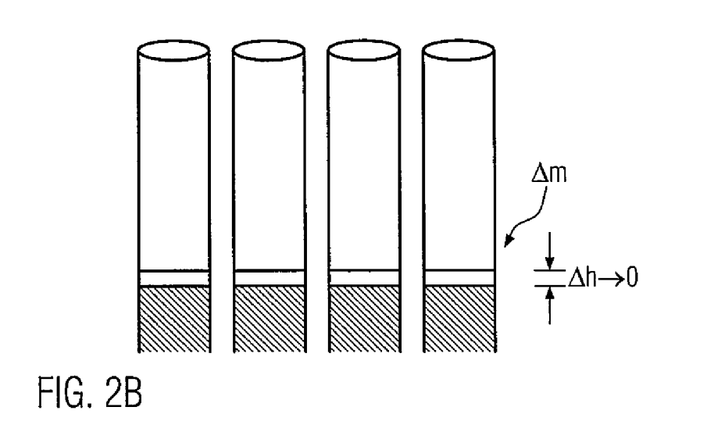

FIG. 2B shows a vertical tube condenser. The difference in height of the fluid level in the event of a leak is small.

Figure 2C:
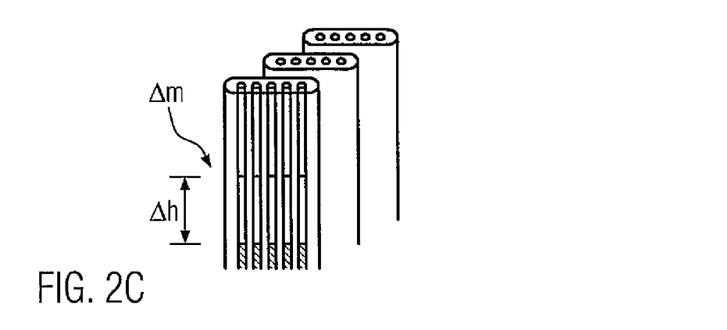

FIG. 2C shows a microchannel condenser. The difference in height of the fluid level in the event of a leak is large.

The variable $\Delta T_{UK}$ is therefore suitable for determining the quantity of working medium in the system and for leak detection. When using microchannel condensers, the leak can in contrast to tube condensers be determined very precisely from sub-cooling since already small leaks entail a significant change of the fluid level. However, the method is basically well suited for all condensers with vertical pipe orientation.

Figure 3:
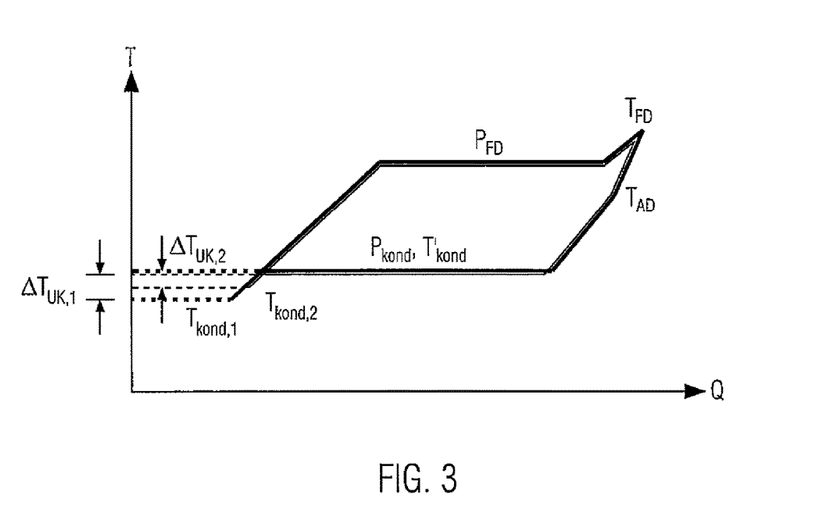
FIG. 3 shows a temperature-heat-diagram of an ORC process.

FIG. 3 shows a temperature-heat-diagram (TQ diagram) of an ORC process. In case 1 (thick line), a large filling quantity is in the vertical condenser. In case 2 (thin line), however, only a small filling quantity is in the vertical condenser. It is evident from the diagram that sub-cooling is in case 2 less than in case 1, $\Delta T_{UK,2} < \Delta T_{UK,1}$.

Figure 4:
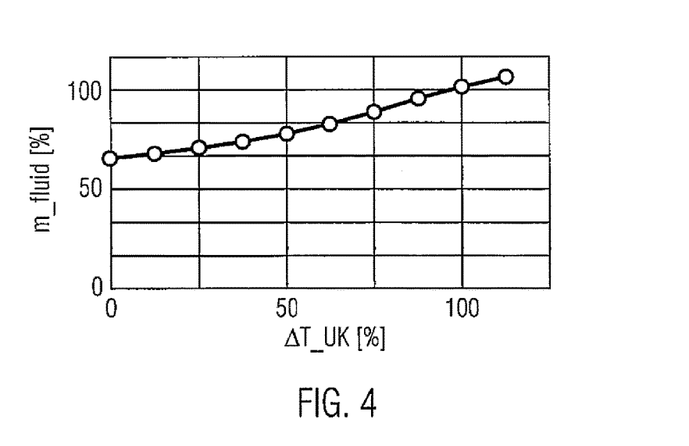
FIG. 4 shows a relationship between sub-cooling and the quantity of working medium.

FIG. 4 shows a relationship by way of example determined from measurement data and simulation between undercooling and the quantity of working medium for a certain ORC system and for an operating state. Where the point (100%, 100%) corresponds to a target state.

Sub-cooling $\Delta T_{UK}$ is usually not directly measured or a measurable variable. However, it can be determined from the directly measured fluid temperature at the exit of the condenser $T_{Kond}$ and from the condensation temperature $T'_{Kond}$ determined from the measured condensation pressure $p_{Kond}$ by way of substance data:

$$\Delta T_{UK} = T'_{Kond} - T_{Kond}$$

The measured condensation pressure/saturation pressure is there already corrected by possible pressure losses up to the pressure gauge and/or pressure variations due to an inert gas possibly present in the system, for example, as an offset.

Factors Relevant for Sub-Cooling

In principle, sub-cooling during operation depends on various parameters. The main ones are: heat input into the system; exhaust gas parameters (pressure and temperature); ambient temperature; volume flow of the cooling medium through the condenser; filling quantity in the system.

Depending on the type of system control, various parameters can be excluded or the filling quantity and thereby the leak is calculated in different ways, respectively.

1. In the simplest case, the ORC system regulates, firstly, to certain live gas parameters and, secondly, to a certain condensation pressure. With the same live gas parameters, however, also the same exhaust gas parameters arise for a given expansion engine. They therefore have no influence on sub-cooling. The variables heat input, ambient temperature and air volume flow all influence the condensation pressure. The latter, however, is controlled to a fixed value. Sub-cooling thereby depends only on the condensation pressure and the system filling, and the filling quantity $m_{fluid}$ of working medium can be determined directly from the sub-cooling and the condensation pressure, respectively:

$$m_{fluid} = f(\Delta T_{UK}, p_{Kond})$$

2. If the live gas parameters $T_{FD}$, $p_{FD}$ and therefore the exhaust gas parameters $T_{AD}$, $p_{AD}$ are variable, then the filling quantity $m_{fluid}$ in the system can be determined from the sum of the filling quantities in the high-pressure section in the system (largely evaporator and supply from the feed pump and live gas line) $m_{HD}$, the filling quantity of fluid working medium in the condenser and the feed line to the feed pump $m_{Kond}$ and the quantity of vaporous working medium in the low pressure section of the system (exhaust gas line and condenser) $m_{ND}$:

$$m_{fluid} = m_{HD} + m_{Kond} + m_{ND}.$$

The following relationships exist for the individual quantity proportions of the working medium:

$$m_{HD} = f(T_{FD}, p_{FD})$$

$$m_{Kond} = f(\Delta T_{UK}, p_{Kond})$$

$$m_{ND} = f(T_{AD}, p_{Kond})$$

These relationships are respectively valid for a given system geometry.

The influence of all relevant variables can be determined from measurements or simulation of the system, respectively. A target value for sub-cooling can therefore be calculated for any system state at a given filling quantity. It is there not necessary that the absolute value for the filling quantity is known. A deviation of the filling quantity can in any case be determined based on a change of the sub-cooling.

Leak Detection and Trend Monitoring During System Operation

With the relationship between sub-cooling and condensation pressure presented above, the prediction of a target value for sub-cooling $\Delta T_{UK,soll}$ can be used for system monitoring.

A leak can occur in two different ways. In the first case, as a sudden loss of a large quantity of working medium, e.g. due to an open pipe connection. Such a leak will inevitably lead to system failure. Methods for monitoring are there not effective. In the second case as a slow leak in which only small amounts of working medium leak over a longer period of time, so that the system can despite the leak initially continue to operate. Without a level sensor, such a leak is detected only with equipment failure. In the second case, sub-cooling can in connection with monitoring operational data be used for early detection. As long as sub-cooling remains within a given target range, the filling quantity of the working medium does not change. However, if it drops below a certain value, a leak is probable. The following states can be detected by way of trend monitoring:

Sub-cooling or the filling quantity calculated therefrom drops below a certain value (alert threshold). The alert threshold is chosen such that a certain safety margin remains until system failure. If the filling quantity due to a slow leak remains below this value, an alert is outputted by the system control after a certain time $\Delta t_{Warnung}$. A time can be approximated from the curve of the filling quantity before and after the alert in which the filling quantity has due to the leak dropped so far that system failure occurs. This trend calculation of the filling quantity is continuously refined using the data recorded. The approximated time defines the interval within which the system must be serviced, so that system shutdown does not occur.

Standard service intervals can be stored for the system. If the filling quantity drops so slowly that system failure prior to the next standard service (for example, annual service) is unlikely, then the leak search and repair can be performed together with the standard service and extra maintenance travel can be saved. If the predicted system failure is prior to the next standard service, then an emergency alert can additionally be outputted by system control.

The filling quantity for operational reasons or due to statistical fluctuations of the measured values shortly drops below the alert threshold. If the value again rises above the threshold within the defined time interval $\Delta t_{Warnung}$, no alert is outputted.

Figure 5:
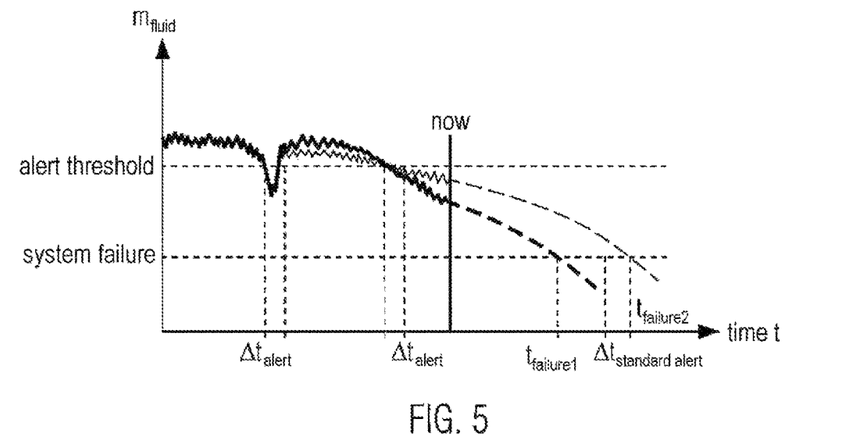
FIG. 5 shows trend monitoring of the sub-cooling.

FIG. 5 shows trend monitoring of sub-cooling with thresholds for alert and system failure. In case 1 (thick line), the predicted time is shorter than the time interval until the standard service, servicing ahead of schedule must be performed. In case 2 (thin line), the predicted system failure is after the standard service, and a leak search and repair can be performed in the context of the standard service. The short drop below the alert threshold does not lead to an alert.

This type of leak detection has the following advantages: A leak is already detected well before system failure. The time until system failure can be predicted and a period of time can thereby be specified within which a system service must be performed so that disruption of operations is avoided. This can overall increase system availability. The predicted time until system failure ensures that servicing can be planned (for example, a simultaneous service of systems in the vicinity, thereby saving time and money). Due to a defined delay of the alert following the first drop below the alert threshold until the actual alert, possibly premature or unnecessary servicing can be avoided, thereby saving servicing costs. The leak detection according to the invention usually requires no additional sensory mechanisms.

Figure 6:
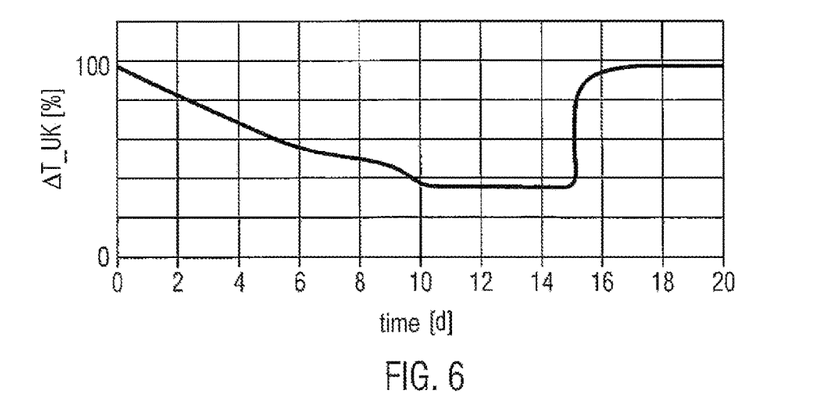
FIG. 6 shows measurement data for sub-cooling at a test facility.

The applicability of the method according to the invention has been demonstrated experimentally. Sub-cooling in the event of a leak was determined over several days in a test facility. With a decreasing quantity of working medium, sub-cooling drops continuously. It was at the end of the experiment possible to reestablish the initial value for sub-cooling in that working medium was replenished, as shown in FIG. 6. The vertical axis there indicates this sub-cooling relative to the nominal value of 100%.

Figure 7:
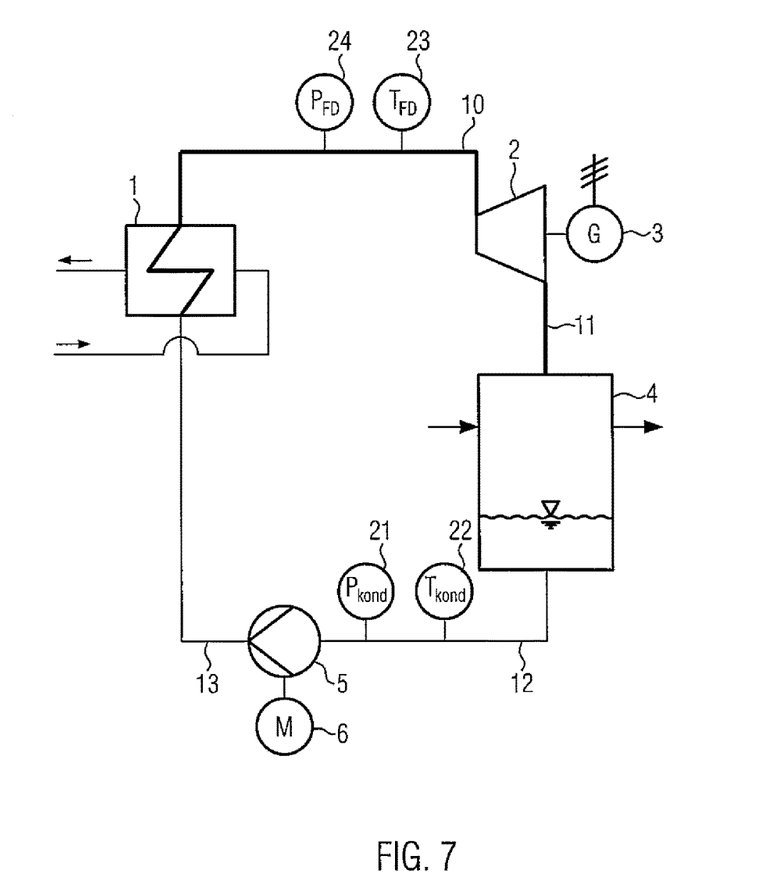
FIG. 7 shows an embodiment of the device according to the invention.

FIG. 7 shows an embodiment of the device according to the invention. The thermodynamic cycle device shown for generating electrical energy from thermal energy is there based on the Organic Rankine Cycle as the thermodynamic cycle (ORC system). The device is composed of the following main components: a feed pump 5 that is driven by a motor 6 and delivers the fluid organic working medium subject to pressure increase to an evaporator 1, the evaporator 1 itself in which the working medium is evaporated subject to the supply of heat and optionally additionally superheated, an expansion engine 2 in which the high pressure gas is expanded, thereby generating mechanical energy which is via a generator 3 converted into electrical energy, and a condenser 4 in which the low-pressure gas from the expansion engine 2 is liquefied. The fluid working medium passes from condenser 4 back to feed pump 5 of the system, whereby the thermodynamic cycle is closed. Also feed line 13 of the feed pump to evaporator 1 and live gas line 10 from evaporator 1 to expansion machine 2 are located in the high-pressure region of the device. On the low pressure side, exhaust gas is passed from expansion engine 2 in exhaust gas line 11 to condenser 4, and condensed, sub-cooled working medium is passed in line 12 from condenser 4 to feed pump 5. The condensation temperature is determined with a temperature sensor 21 and the condensation pressure by way of pressure sensor 22, where sensors 21 and 22 in this example detect the working medium in line 12. Alternatively, temperature sensor 21 could also be disposed within condenser 4 at the lower end in the vicinity of the outlet and/or pressure sensor 22 could be disposed in the condenser or at line 11. In this embodiment, a temperature sensor 23 and a pressure sensor 24 can also be provided at line 10 for detecting the respective live gas values on the high-pressure side.

Leak Detection at a Standstill

At a standstill with a cold system, the gas pressure of the working medium at ambient temperature arises in the system. Depending on the type of working medium, this pressure can be below the ambient pressure, which makes leak detection with conventional methods impossible. Since no medium is circulated and the same temperature prevails throughout the system, no sub-cooling can be determined. By use of the method disclosed in patent application EP 13189918.9 as natural circulation, it is ensured that the working medium is circulated by natural circulation also during standstill and that sub-cooling arises thereby. The same method as during operation can then be used for leak detection.

Advantages of the Invention Over General Prior Art

It is with the invention possible to detect leaks e.g. in an organic cycle without using special sensors (level sensors or the like). Level sensors can additionally only be used where a measurable fluid level is given in the system, typically in a feed tank. The invention enables reliable leak detection, even if the system is not provided with a feed tank. Certain working media at ambient temperature have a gas pressure (which at a standstill prevails in the entire system) which is below the ambient pressure. In this case, no working medium escapes from the system during standstill and can therefore not be detected. By applying the invention described herein in connection with the "natural circulation" mentioned above, leak detection is nevertheless possible. The invention can advantageously then be applied where perpendicular condensers with the smallest possible cross-sectional area of the tube or cross-sectional area of the channel are used as condensers instead of common prior art heat exchangers having tubes arranged horizontally. This is ensured in particular by the use of microchannel condensers or plate heat exchangers.

The embodiments illustrated are only by way of example and the full scope of the present invention is defined by the claims.

The invention claimed is:

1. Method for detecting a leak in a thermodynamic cycle device, where said cycle device comprises a condenser for condensing vaporous working medium and where said method comprises the following steps:
   determining sub-cooling of the working medium in the condenser, wherein sub-cooling is determined as the difference between a condensation temperature in said condenser and a temperature of a fluid working medium exiting said condenser;
   detecting a leak in an event that said sub-cooling determined differs from a setpoint value for said sub-cooling or in an event that a filling quantity of said working medium in said thermodynamic cycle device, being determined from said determined sub-cooling, differs from a setpoint value for the filling quantity; and
   wherein a respective setpoint value for said sub-cooling or for said filling quantity is determined for different operational modes of the thermodynamic cycle device and wherein the different operational modes of the thermodynamic cycle device include a mode of natural circulation during standstill of the thermodynamic cycle device.

2. Method according to claim 1, where the filling quantity of said working medium, in particular a mass or volume of said working medium, is determined from the determined sub-cooling by use of a relationship between sub-cooling and the filling quantity.

3. Method according to claim 2, where said relationship between sub-cooling and the filling quantity is in particular a functional relationship or a tabular association between sub-cooling and the filling quantity.

4. Method according to claim 1, where the condensation temperature is determined from a condensation pressure measured.

5. Method according to claim 1, where said condenser comprises condenser surfaces that are arranged vertically or condenser surfaces that are inclined at an angle between 0° and 80°, preferably between 0° and 45°, highly preferably between 0° and 30° relative to the vertical direction, where said condenser is in particular a vertical tube condenser, a microchannel condenser, a mini or microtube condenser, or a vertical plate condenser.

6. Method according to claim 1, where sub-cooling is determined at a first and a second point in time and said step of detecting comprises:
   detecting said leak in an event that sub-cooling has at the second point in time decreased by a predetermined magnitude with respect to the sub-cooling at the first point in time or in an event that the filling quantity has reduced by a predetermined amount.

7. Method according to claim 6, where no alert signal is outputted for sub-cooling or the filling quantity in an event of a drop below an alert threshold lasting less than an alert time period and an alert signal is outputted in an event of a drop below said alert threshold lasting for said alert time period or longer.

8. Method according to claim 6, where sub-cooling and the filling quantity are determined at further points in time, in particular continuously, and a time of failure is predicted from the values determined at which a threshold sub-cooling or a threshold filling quantity is reached at which said thermodynamic cycle device is no longer operational.

9. Method according to claim 8, where an additional service for repairing said leak is performed prior to the time of failure in an event that the predicted time of failure is prior to a time of a standard service of said thermodynamic cycle device, and/or a service for repairing said leak is performed together with the standard service in an event that the predicted time of failure is at or after the time of standard service of said thermodynamic cycle device.

10. Method according to claim 1, where the setpoint value for sub-cooling is predetermined for different states of said thermodynamic cycle device.

11. A computer program product embodied on a non-transitory computer readable medium for detecting a leak in a thermodynamic cycle device, the computer program product comprising a computer-readable storage medium having computer-readable program code portions stored therein, the computer-readable program code portions comprising:
   an executable portion configured for determining sub-cooling of the working medium in a condenser, wherein sub-cooling is determined as the difference between a condensation temperature in said condenser and a temperature of a fluid working medium exiting said condenser;
   an executable portion configured for detecting a leak in an event that said sub-cooling determined differs from a setpoint value for said sub-cooling or in an event that a filling quantity of said working medium in said thermodynamic cycle device, being determined from said determined sub-cooling, differs from a setpoint value for the filling quantity; and
   wherein a respective setpoint value for said sub-cooling or for said filling quantity is determined for different operational modes of the thermodynamic cycle device and wherein the different operational modes of the thermodynamic cycle device include a mode of natural circulation during standstill of the thermodynamic cycle device.

12. Thermodynamic cycle device, in particular an ORC device, comprising:
   a condenser for condensing vaporous working medium;
   a temperature sensor for measuring a temperature of a fluid working medium exiting from said condenser;
   a device for determining sub-cooling of the working medium in said condenser, wherein sub-cooling is determined as the difference between a condensation temperature in said condenser and the temperature of a fluid working medium exiting said condenser; and for detecting a leak in an event that the sub-cooling determined differs from a setpoint value for the sub-cooling or in an event that a filling quantity of the working medium in said thermodynamic cycle device, being determined from the determined sub-cooling, differs from a setpoint value for the filling quantity; and
   wherein a respective setpoint value for said sub-cooling or for said filling quantity is determined for different operational modes of the thermodynamic cycle device and wherein the different operational modes of the thermodynamic cycle device include a mode of natural circulation during standstill of the thermodynamic cycle device.

13. Device according to claim 12, where said device for measuring and detecting comprises:
   a pressure sensor for measuring the condensation pressure which is in particular arranged in said condenser; and
   an evaluation device for
   (i) determining a condensation temperature in said condenser from said condensation pressure measured,
   (ii) determining the sub-cooling of the working medium in said condenser as the difference between a condensation temperature in said condenser and a temperature of the fluid working medium exiting said condenser, and
   (iii) detecting said leak in the event that the sub-cooling determined differs from the setpoint value for the sub-cooling or in the event that the filling quantity determined from the determined sub-cooling differs from the setpoint value for the filling quantity.

14. Device according to claim 13, where said evaluation device for determining the filling quantity of the working medium in said thermodynamic cycle device, in particular a mass or a volume of the working medium, is formed from the sub-cooling thus determined using a relationship between the sub-cooling and the filling quantity.

15. Thermodynamic cycle device according to claim 12, where said condenser comprises vertically arranged condenser surfaces, in particular, where said condenser is a vertical tube condenser, a microchannel condenser, a mini or microtube condenser, or a vertical plate condenser.

16. Thermodynamic cycle device according to claim 13, where said condenser comprises vertically arranged condenser surfaces, in particular, where said condenser is a vertical tube condenser, a microchannel condenser, a mini or microtube condenser, or a vertical plate condenser.

17. Thermodynamic cycle device according to claim 14, where said condenser comprises vertically arranged condenser surfaces, in particular, where said condenser is a vertical tube condenser, a microchannel condenser, a mini or microtube condenser, or a vertical plate condenser.

18. Method according to claim 2, where sub-cooling is determined at a first and a second point in time and said step of detecting comprises:
   detecting said leak in an event that sub-cooling has at the second point in time decreased by a predetermined magnitude with respect to the sub-cooling at the first point in time or in an event that the filling quantity has reduced by a predetermined amount.

* * * * *